No. 879,715. PATENTED FEB. 18, 1908.
J. A. ADAMS.
SEED COTTON DRYING APPARATUS.
APPLICATION FILED OCT. 19, 1907.
2 SHEETS—SHEET 1.
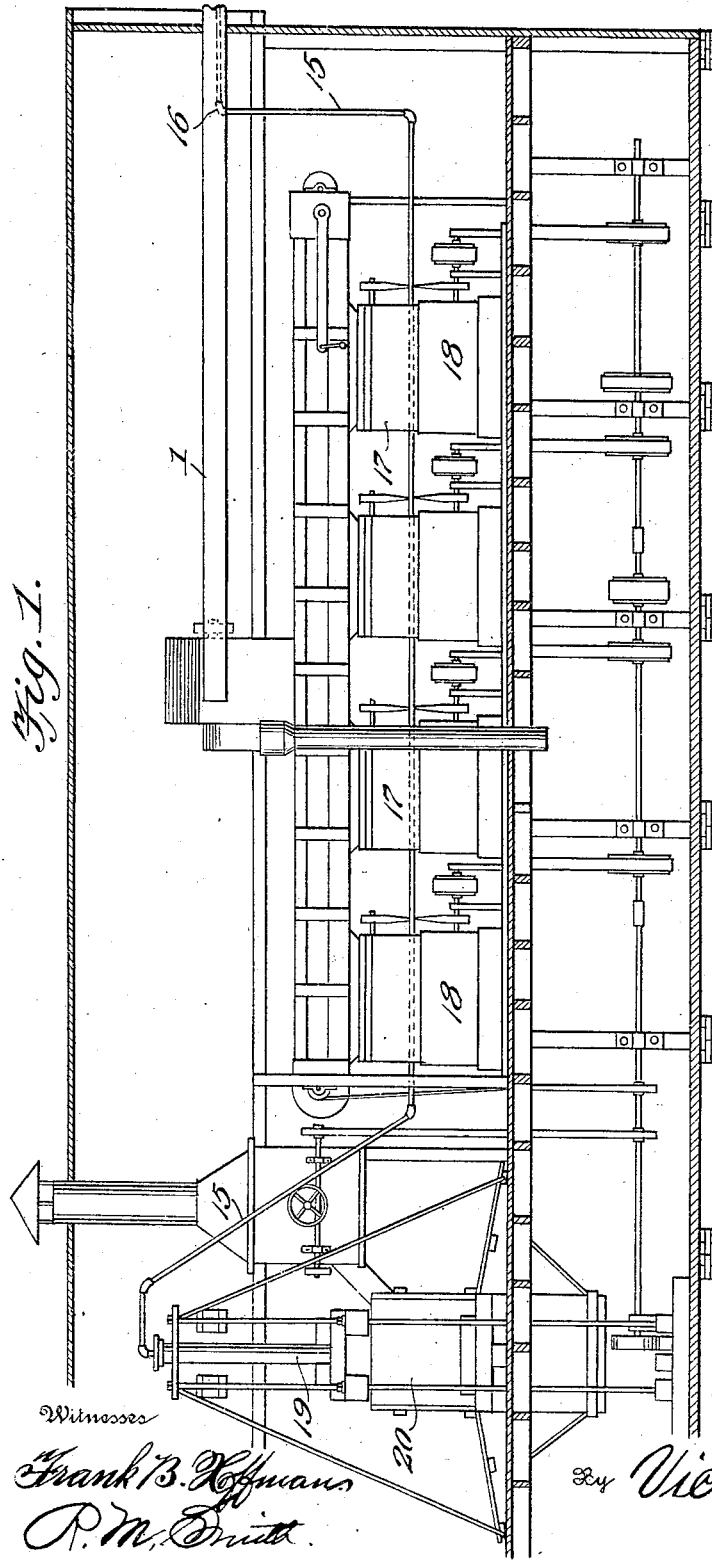
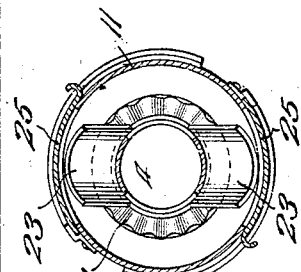
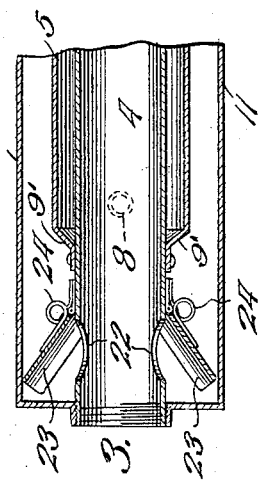
Witnesses
Frank B. Hoffman
P. M. Smith
Inventor
Joseph A. Adams
By Victor J. Evans
Attorney

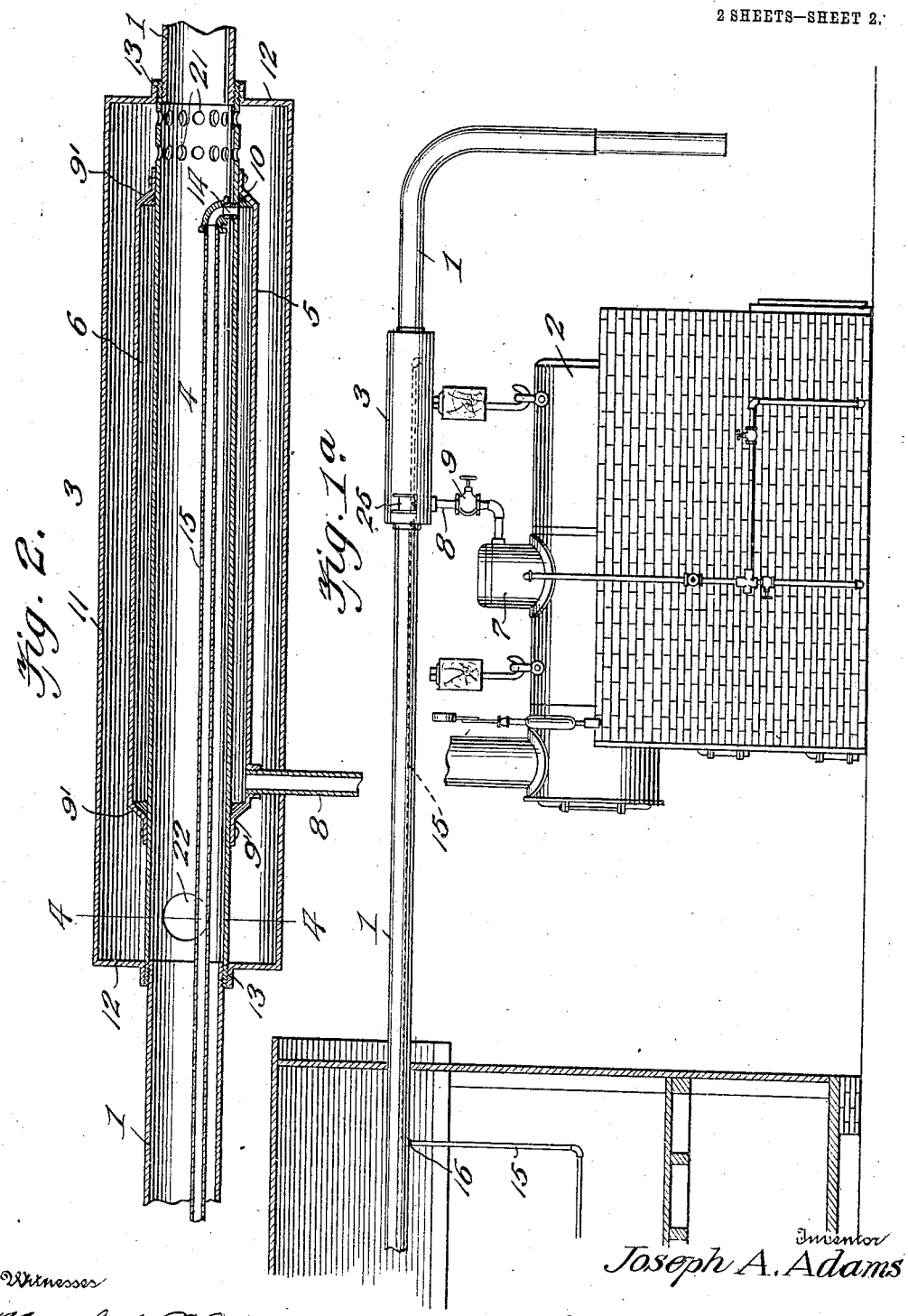

UNITED STATES PATENT OFFICE.

JOSEPH ABNER ADAMS, OF WOODVILLE, OKLAHOMA.

SEED-COTTON-DRYING APPARATUS.

No. 879,715.  Specification of Letters Patent.  Patented Feb. 18, 1908.

Application filed October 19, 1907. Serial No. 398,247.

*To all whom it may concern:*

Be it known that I, JOSEPH ABNER ADAMS, a citizen of the United States, residing at Woodville, in District 22, Oklahoma, have invented new and useful Improvements in Seed-Cotton-Drying Apparatus, of which the following is a specification.

This invention relates to seed cotton drying apparatus and the object in view is to provide simple and effective drying apparatus capable of use in connection with any ordinary type of cotton ginning machinery now in common use and embodying the ordinary suction and pneumatic conveyer or cotton flue.

By means of the drying apparatus hereinafter particularly described, the seed cotton as it passes along the suction conveyer or cotton flue and before it is delivered to the distributer and feeders, is subjected to a thorough heating and drying and it is further heated and dried at a point between the feeders and gin saws just before it is taken up and acted upon by the gin saws, the cotton being thus delivered to the gins in a dry and fluffy condition.

As is well understood, in cool, damp or rainy weather, a great amount of trouble and annoyance is experienced by those handling the cotton by reason of the fact that cotton readily absorbs moisture and the feeding of such moist or wet cotton along the suction conveyer or cotton flue is admitted with much difficulty and if it reaches the saws in a wet condition the saws are rendered comparatively ineffective for the purpose for which they are designed. With the apparatus of the invention, the cotton is rendered dry and fluffy and is delivered to the gin saws in perfect condition to be operated thereon.

With the above and other objects in view, the invention consists in the novel construction, combination and arrangement of parts hereinafter fully described, illustrated and claimed.

In the accompanying drawings, Figure 1 is a sectional elevation of a cotton gin plant showing the application of the present invention thereto. Fig. 1ª is a view showing an extension of Fig. 1 in order to illustrate the boiler and the relation of the drying apparatus of this invention thereto. Fig. 2 is an enlarged vertical longitudinal section through the main part of the drying apparatus. Fig. 3 is a similar view of one end of the drier shown in Fig. 2, but taken at right angles to Fig. 2. Fig. 4 is a cross-section through Fig. 3 taken adjacent to the automatic valves.

The invention contemplated herein resides mainly in a special drier best illustrated in Figs. 2, 3 and 4, which drier is located in the suction or pneumatic conveyer or cotton flue shown at 1. The flue 1 is the pipe into which the cotton is fed from a farmer's wagon or other source of supply and through which such cotton is carried to the feeders and gins. At a suitable point in the length of said suction conveyer or cotton flue 1, and preferably just over the steam boiler 2 is arranged a drier 3 which embodies an inner shell 4 and an outer shell 5, the said shells being of different internal diameters so as to leave an intervening annular space 6 forming what I term a steam chamber which communicates directly with the dome 7 of the boiler 2 by means of a steam supply pipe 8 having a controlling valve 9 therein as shown in Fig. 1ª. The inner shell 4 extends entirely through and beyond the opposite end of the outer shell 5 and the ends of the outer shell are closed by means of heads 9' which are riveted or otherwise secured to the inner shell as clearly shown in Fig. 2. The joints between the inner and outer shells should be steam and air tight and if necessary to accomplish this result, the gaskets or packing rings 10 may be interposed between the heating surfaces of the two shells.

The steam chamber above described is entirely surrounded by and incased within an outer jacket 11 having central apertured heads 12 in which the opposite ends of the inner shell 4 are secured by means of screw threads or otherwise as shown at 13. The adjacent ends of the suction or pneumatic conveyer or cotton flue are connected with the drier above described by coupling the ends thereof to the opposite ends of the drier in the manner illustrated in Fig. 2.

Steam is supplied to the chamber 6 as above stated by means of the supply pipe 8 which pipe passes through the outer jacket 11. The steam leaves the chamber 6 at the point 14 where it escapes into a steam pipe 15 which passes lengthwise through the drier and on through the conveyer or cotton flue 1 and at a suitable point just before reaching the feeders and gins, said pipe 15 leaves the flue 1 as shown at the point 16 and then extends horizontally through all of the feeders shown at 17 just over the saws of the gins 18. After thus passing through all of the feeders, the pipe leads upward and communicates with the steam cylinder 19 of the packer 20, the steam supplied by said pipe serving to run the packer and tamp or pack the cotton. The exhaust of the steam at regular intervals from the packer keeps the steam from condensing in the pipes, any steam condensing in the drying chamber 6 passing back as water through the feed pipe 8 to the boiler.

At the front, the inner shell 5 of the drier is provided with a large number of perforations 21 forming air ports which afford communication between the inner shell and the interior of the jacket 11. At its opposite end, the inner shell 4 is provided with oppositely arranged valve openings 22 and in order to control said openings and close the same automatically at the proper times, flap valves 23 are arranged upon the outer side of said inner shell as shown in Fig. 3, said valves being shaped to conform to the curvature of the outer surface of said inner shell and being hinged thereto in any convenient manner. These valves 23 are given a normal tendency outward or made to normally assume an open position by means of valve opening springs 24 which may be of any suitable construction and of a tension afforded by the fan of the apparatus. The outer jacket 11 may be provided with doors 25 in line with the valves 23 for giving access to said valves should it become necessary.

By reason of the provision of the air ports 21 and the valve controlled openings 22, the air from the suction conveyer or cotton flue is caused to pass through the chamber within the jacket 11 toward the rear end of the jacket. In doing this the air is divided up by the air ports 21 at the front end of the chamber, passes thence between the outer jacket and the outer shell of the steam chamber and enters the valve openings the effect being to slow down the speed of the cotton in its passage through the conveyer or cotton flue, in the cylinder at the same time projecting the cotton from the radiation of the hot walls of the steam chamber as it passes therethrough. Should the flue become too closely packed or choked with cotton the automatic valves will close by action of the extra air pressure and when the pressure increases sufficiently by being confined entirely to the inner shell or cotton flue, the cotton is pulled onward with greater rapidity thus clearing out that portion of the flue which lies within the steam chamber, whereupon the valves 23 will again open up by the action of the valve opening springs and allow the air within the cotton flue to be again divided up and passed through the chamber formed by the outer jacket 11, thus slowing the movement of the cotton automatically.

By reason of the steam pipe 15 passing through a considerable length of the cotton flue 1, ordinarily about forty feet until it reaches a point near the first gin stand said pipe renders the cotton flue so hot that it continues heated the balance of the distance of the latter conveyer which is ordinarily about twenty or thirty feet additional and in all this distance traveled the cotton is heated and finally falls down through the cleaner and separator or the vacuum box, as the case may be. The cotton then falls into the feeders of the several gin stands passing thence just over and in front of the steam pipe 15 which as previously stated extends through the front of the feeders just above the gin saws. The cotton then falls into direct contact with the saws where the seed is separated from the cotton and the drying process through which it has passed places said cotton in the finest possible condition for this separation.

By use of the drying apparatus herein above described, a saving of considerable stock and money will be effected for the farmer and a corresponding saving in time will be effected for the ginner. The cotton buyer will also be greatly benefited as he will be able to class the cotton intelligently when it has been handled by the drying apparatus of this invention. It will also be of advantage to the spinner for it will do away with rotten cotton in the bale when it appears to be sound. It will also be of great benefit to the consumer of cotton goods inasmuch it will do away with a large proportion of rotten goods being put on the market. Furthermore, when the cotton has been operated upon by the drying apparatus of this invention it is rendered soft and fluffy and the oily substance of the cotton is brought out which greatly enhances the value of the cotton and causes the staple to pull from the seed without cutting, thereby giving the full value of its textile strength. Furthermore, fire risks caused from the friction due to the handling of wet cotton will be greatly reduced.

Having thus fully described the invention, what is claimed as new is:—

1. A seed cotton drying apparatus embodying a steam chamber located in a suction or pneumatic conveyer or cotton flue and embodying an inner shell through which the cotton passes, an outer shell having a steam and air tight connection therewith and leaving an annular steam space between the inner and outer shells, and an outer jacket inclosing beneath the inner and outer shells and providing an air circulation space, substantially as and for the purpose described.

2. A seed cotton drying apparatus embodying a drier interposed at a suitable point in a suction conveyer or cotton flue and comprising an inner shell through which the cotton passes, an outer shell surrounding the same and secured thereto by a tight joint to leave an annular steam space, an outer jacket inclosing the said shells, a steam supply pipe leading to said steam chamber, and valve controlled openings between the inner shell and outer jacket.

3. A seed cotton drying apparatus embodying a drier interposed in a suction conveyer or cotton flue and embodying an inner shell through which the cotton passes, an outer shell leaving an intervening annular steam chamber between the two shells, an inclosing outer jacket covering both shells, air inlet ports affording communication between the inner shell and the outer jacket, and valve controlled openings also leading from the inner shell into the outer jacket.

4. A seed cotton drying apparatus embodying a drier located at a suitable point in the suction conveyer or cotton flue and embodying an inner shell through which the cotton passes, an outer shell surrounding the inner shell and secured thereto and leaving an annular steam chamber, a steam supply pipe leading thereto, an outer inclosing jacket surrounding both shoulders, means for diverting air from the cotton flue through said outer jacket, and a steam pipe leading from the steam chamber into and lengthwise of said suction conveyer or cotton flue.

5. A seed cotton drying apparatus embodying a drier interposed at a suitable point in the length of the pneumatic or suction conveyer or cotton flue and embodying connected inner and outer shells forming an annular steam chamber through which said cotton is caused to pass, an outer jacket surrounding said steam chamber, air ports leading from the inner tube into the outer shell, valve openings in said inner shell, and spring sustained valves controlling the last named openings and adapted to operate automatically as the suction pressure varies.

6. A seed cotton drying apparatus embodying a drier located at a suitable point in the suction conveyer or cotton flue and embodying a steam chamber through which the cotton is caused to pass, an outer jacket inclosing said steam chamber, and means including an automatic valve for diverting a portion of the pressure from the cotton flue through said outer jacket.

7. A seed cotton drying apparatus embodying a drier interposed at a suitable point in the suction conveyer or cotton flue and embodying an annular steam chamber through which the cotton is caused to pass, and means affecting the internal pressure within the suction conveyer or cotton flue for retarding the movement of the cotton through said steam chamber.

8. A seed cotton drying apparatus embodying a drier interposed at a suitable point in the length of the suction conveyer or cotton flue and embodying an annular steam chamber through which the cotton is caused to pass, a steam supply pipe leading from the boiler to said chamber, and a steam pipe leading from said steam chamber into the cotton flue and extending lengthwise thereof to a point beyond said drier and lengthwise of and within the suction conveyer or cotton flue to a point adjacent to the feeders and gins.

9. A seed cotton drying apparatus embodying a primary drier located at a suitable point in the length of the suction conveyer or cotton flue and embodying an annular steam chamber through which the cotton is caused to pass, means associated with said drier for automatically retarding the movement of the cotton therethrough, a steam supply pipe leading to said drier, and a steam pipe leading from said drier through the several feeders, said pipe passing through the front of each feeder just over the gin saws in position to heat the cotton as it is delivered by the feeders to the saws.

In testimony whereof I affix my signature in presence of two witnesses.

JOSEPH ABNER ADAMS.

Witnesses:
 W. Y. WILEY,
 J. T. INGRAM.